United States Patent Office 2,889,365
Patented June 2, 1959

2,889,365

PROCESS FOR PRODUCING MONOCHLOROACETYL CHLORIDE BY CHLORINATING KETENE IN SULFUR DIOXIDE

Erhard J. Prill, Dayton, Ohio, assignor to Monsanto Chemical Company, St. Louis, Mo., a corporation of Delaware No Drawing. Application June 27, 1957
Serial No. 668,326

7 Claims. (Cl. 260—544)

The present invention is directed to an improvement in the process of preparing chloroacetyl chloride by chlorination of ketene. The improvement comprises conducting the chlorination in the presence of sulfur dioxide.

An object of the present invention is to adapt the ketene chlorination process to the preparation of chloroacetyl chloride free of dichloroacetyl chloride. It is a further object to adapt the process to the preparation of chloroacetyl chloride of good purity at reasonable chlorination rates and conversions.

The process of the present invention can be illustrated by the following equation:

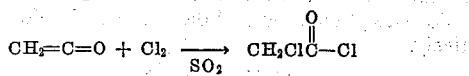

It is a further object of the present invention to direct the chlorination of ketene toward chloroacetyl chloride at the expense of dichloroacetyl chloride.

In the past, chloroacetyl chloride has been prepared by chlorination of ketene in ether or other solvents, or in the vapor phase. However, the conditions and solvents utilized in prior procedures permit the production of substantial amounts of dichloroacetyl chloride. The only prior proposal for avoiding the production of dichloroacetyl chloride involved the use of such large excesses of ketene in the vapor phase as to make the process impractical because of the poor conversions.

The production of any substantial amounts of dichloroacetyl chloride in the chlorination of ketene is particularly undesirable as it not only lowers the yield of the chloroacetyl chloride, but the dichloroacetyl chloride is very difficult to separate from the chloroacetyl chloride; the proximity of the boiling points of the two compounds makes their separation by distillation practically impossible. Thus, when pure chloroacetyl chloride is desired, the advantages of a procedure for preparing chloroacetyl chloride free of dichloroacetyl chloride are readily apparent. Pure chloroacetyl chloride is particularly needed in the preparation of chloroacetamides, e.g., in the preparation of N,N-diallyl-α-chloro acetamide, a commercial herbicide by reaction of the chloroacetyl chloride with diallyl amine.

The present invention involves conducting the chlorination of ketene in the presence of $SO_2$. For some reason, the $SO_2$ is effective in directing the chlorination toward the production of chloroacetyl chloride at the expense of dichloroacetyl chloride. Small amounts of $SO_2$ have some effect in this regard, and sufficiently large amounts of $SO_2$ cause the production of chloroacetyl chloride entirely free of dichloroacetyl chloride.

Prior to the performance of the actual laboratory procedures described herein below, sulfur dioxide did not appear appropriate for use as solvent in the described chlorination procedures because of its known propensity to chlorination in the presence of various organic materials. It was pleasantly surprising, therefore, to find that sulfur dioxide could be used in the chlorination procedure without undue chlorination to sulfuryl chloride, and that sulfur dioxide had a unique effect in directing the chlorination of ketene to chloroacetyl chloride.

The general liquid-phase chlorination procedure of the present invention involved charging a reactor or flask e.g., a 500 ml. flask, with sulfur dioxide, cooling to the desired reaction temperature, and introducing ketene and chlorine for a specified time. The chlorine was introduced from the bottom of the reaction mixture by means of a 2 mm. capillary or by means of a sintered glass disperser. Ketene was introduced through a hollow stirrer (Ace Glass "Mini-Lab" Stirrer modified to fit a 34/45 standard taper joint). At the completion of the reactant introduction, the reaction mixture was distilled through a 10 inch helix-packed column. The sulfur dioxide was permitted to evaporate through an ice-cooled condenser prior to the distillation.

The following examples are illustrative of certain embodiments of the invention, but the invention is not to be considered as limited thereto.

EXAMPLE 1

A 500 ml. Morton flask was fitted with a Dry-Ice condenser, two sintered glass inlet tubes, a thermometer, and a hollow-shaft stirrer. The reactor was charged with about 500 ml. of liquid sulfur dioxide, and cooled to −32° C.

Chlorine and ketene were bubbled into the reactor through separate tubes, the chlorine rate being adjusted to maintain a slight yellow color in the reaction mixture to insure an equivalence of chlorine. The temperature was maintained at about −20° C. by cooling means. (After one hour, the ketene was introduced through the stirrer rather than through a sintered glass inlet tube.) After about three hours, the chlorine addition was stopped and the mixture became colorless; the ketene addition was stopped, the Dry Ice-cooled condenser was replaced with an ice-cooled condenser, and the sulfur dioxide was permitted to evaporate. A total of 86 g. of $Cl_2$ had been introduced. The 135.7 g. of reaction product was transferred to a pot for distillation. Distillation through a 10-inch helix-packed column gave the following fractions:

| Fraction | B.P. (° C.) | Weight (grams) |
|---|---|---|
| 1 | Up to 103 | 2.3 |
| 2 | 103–106 | 102.7 |
| Residue | | 15.2 |

Sulfur analysis indicated little contamination of the product (fraction 2) with sulfur compounds.

Found:
  S, 0.45, 0.49
  $SO_2$, 0.77, 0.73
Neutral equivalent:
  Calculated:
    $CH_2ClCOCl$, 56.45
    $CHCl_2COCl_2$, 73.7
  Found: 55.87, 56.02 (duplicate determinations)

The neutral equivalent value indicates the absence of dichloroacetyl chloride, a fact which was confirmed by hydrolysis followed by permanganate titration (any dichloroacetyl chloride would have been hydrolyzed to oxalic acid).

The ketene in the above example was generated from acetic anhydride; the ketene gas was conducted from the generator through an acetone-cooled condenser (at −30 to −50° C.), a cyclone separator to remove liquid, and an additional condenser, before being introduced into the reactor. The ketene was introduced at the rate of 0.2 to 0.5 mole per hour. The chlorine was dried by bubbling through sulfuric acid prior to introduction to the reactor.

Any source of ketene can be used, but it is desirable that the ketene be free of any substantial amounts of hydrocarbon, e.g., methane, ethane, etc., or carbon monoxide, contaminants which catalyze the chlorination of $SO_2$ to $SO_2Cl_2$. Ketene generated from acetic anhydride and purified by the procedures described herein is very suitable. In commercial use, however, it will probably be preferable to utilize acetic acid itself as the ketene precursor rather than the anhydride. Ketene generated from acetone is apt to be contaminated with hydrocarbons and good purification procedures are required to obtain the best results with ketene from this source.

EXAMPLE 2

Liquid sulfur dioxide, 150 ml., was charged to a stirred reactor and ketene was introduced at the rate of 0.35 mole per hour and chlorine at 0.34 mole per hour for a period of 1.5 hours while the temperature was maintained at −10 to −24° C. The reaction mixture was allowed to stand under a condenser while the sulfur dioxide distilled. The reaction mixture was warmed to 30° C. to assist in the sulfur dioxide removal, and then transferred to a distilling flask for distillation through a 10-inch column (tantalum wire spiral):

| Fraction | B.P. (° C.) | Weight (grams) |
|---|---|---|
| 1 | Up to 104 | 3.4 |
| 2 | 104–107 | 43.6 |
| Residue | | 7.8 |

Neutral equivalent:
Calculated:
  $CH_2ClCOCl$, 56.45
  $CHCl_2COCl_2$, 73.7
Found: 55.67, 55.64

Infrared analysis indicated the absence of dichloroacetyl chloride.

The ketene reactant above was generated by pyrolysis of acetic anhydride in an apparatus of the type described by Fischer et al. J. Org. Chem., 18, 1055 (1953). The flow rate of the acetic anhydride was measured by a flow meter and controlled by a needle valve. The generator was calibrated by reacting the ketene-containing gases with excess standard sodium hydroxide solution and then titrating with hydrochloric acid. The chlorine flow rate was measured by a flow meter, and the total amount of chlorine was also determined gravimetrically by loss of weight of the chlorine cylinder.

EXAMPLE 3

This example demonstrates that in the chlorination of ketene in solvents other than sulfur dioxide, such as methylene chloride, large amounts of dichloroacetyl chloride are produced even at very low temperatures. In two separate flasks 350 ml. amounts of methylene chloride were cooled to about −50° C. Ketene, 0.35 mole, was bubbled into one flask through a hollow stirrer in a one-hour period. Chlorine, 0.35 mole, was bubbled into the other flask at the same time. The chlorine solution was then poured into the ketene solution with cooling by a bath at about −50° C. In about 45 minutes, the bath temperature had risen to −10° C., and the reaction mixture was transferred to a distillation flask and distilled:

| Fraction | B.P. (° C.) | Weight (grams) |
|---|---|---|
| 1 | 43–105 | Some low boiling material. |
| 2 | 105–107 | 14.7. |
| Residue | | 16.0. |

The neutral equivalent on fraction 2 was as follows:
Calculated:
  $CH_2ClCOCl$: 56.45
  $CHCl_2COCl$: 73.7
Found: 64.1, 64.5; average=64.3
Assuming only two components in the product, $$\text{Percent chloroacetyl chloride} = \frac{73.7 - 64.3}{73.7 - 56.45} \times 100 = 54.5$$

Percent dichloroacetyl chloride=45.5%

Table I, below, illustrates the results obtained in the chlorination of ketene in the presence of sulfur dioxide contrasted with the results obtained by use of various other solvents and additives. In Table I and elsewhere in the present specification CAC and DCAC designate chloroacetyl chloride and dichloroacetyl chloride, respectively.

Table I

| Run | Solvent type (grams) | Additive | Temp. (° C.) | Time (hours) | Percent conversion to CAC | Percent DCAC in distilled product |
|---|---|---|---|---|---|---|
| 1 | Acetyl chloride (150) | | 6 to 14 | 2.0 | 32 | 30.4 |
| 2 | $C_6H_5NO_2$ (150) | | 16 to 22 | 1.5 | 44 | 23.1 |
| 3 | $CH_2Cl_2$ (350) [1] | | −50 | 1.0 | 20 | 45.5 |
| 4 | CAC (150) | Chloranil (1.5) | 12 to 16 | 2.5 | 7 | 18.5 |
| 5 | CAC (150) | $Cu(OAC)_2$ (1.5) | 17 to 30 | 2.0 | 7 | 12.0 |
| 6 | CAC (150) | Norite | 16 to 24 | 1.5 | 19 | 15.2 |
| 7 | CAC (150) | $C_6H_5NH$ (1.0) | 10 to 14 | 1.5 | 7 | 10.1 |
| 8 | $SO_2$ (214) | | −24 to −10 | 1.5 | 75 | None |
| 9 | $SO_2$ (725) [2] | | −20 to −12 | 3.0 | 75 | None |
| 10 | $SO_2$ (19.8) [2] / CAC (142) | | −14 to −12 | 2.1 | 23 | 2.65 |

[1] 350 ml. methylene chloride solution containing 0.35 mole each of ketene and chlorine.
[2] Slight excess of chlorine maintained in these runs.

The runs in the table were conducted by bubbling approximately equimolar amounts of ketene and chlorine into the reaction mixture in the designated time periods, the actual amounts varying from 0.35 to 0.67 mole.

The importance of sulfur dioxide in eliminating the dichloroacetyl chloride production is readily apparent from the above data. It should be noted that even in run 10 in which the amount of sulfur dioxide was very small in relation to the amount of chloroacetyl chloride present, that the dichloroacetyl chloride in the product was reduced to a small amount.

When $CCl_4$ was utilized as solvent, the amount of dichloroacetyl chloride in the product was 7.42 times the amount of chloroacetyl chloride, and the actual conversion to chloroacetyl chloride was only 2%.

EXAMPLE 4

A jacketed condenser was constructed so as to have two small gas inlet tubes on the top directed parallel to the longitudinal axis of the condenser, and another larger inlet at the top; the 35 cm. condenser was of 26 mm. diameter with a 6 mm. concentric thermowell down the center. The condenser was packed with Berl saddles to within about 3 inches of the gas inlet tubes. Chlorine was admitted through one gas inlet tube, and sulfur dioxide and ketene were introduced through the other gas inlet tube. The sulfur dioxide flow rate from a cylinder was about 23.4 liters/hour, and the ketene gas flow rate was about 0.23 to 0.5 mole/hour. The reaction period was 3.25 hours, during which time about 1.69 moles of chlorine gas was admitted to the reactor. The temperature of the condenser jacket was about −40 to −50° C., and the reaction temperature was 88 to 106° C. (measured about 1 inch below the gas inlet tubes). Distillation of the collected product gave 84.7 grams of material at 101–105° C., neutral equivalent=59.55. Titration of the material indicated it contained about 12.12% of dichloroacetyl chloride. The conversion to chloroacetyl chloride (based on chlorine) was 39%. The ketene in this run generated from acetic anhydride.

EXAMPLE 5

In a procedure similar to that of Example 4, ketene and chlorine each supplied at 0.35 mole/hour were reacted during a 3.5 hour period in a helix-packed column at reaction temperatures of 102 to 128° C. No sulfur dioxide was used in this procedure. Distillation gave 62.8 grams at 103–107° C., neutral equivalent=64.2. On the basis of the neutral equivalent, the amount of dichloroacetyl chloride contaminant was indicated to be about 45%. The conversion to chloroacetyl chloride was 31%.

A comparison of the results of Example 4 with Example 5 indicates that sulfur dioxide effectively lowers the amount of dichloroacetyl chloride contaminant in vapor phase chlorinations. The use of greater amounts of sulfur dioxide will lower the amount of dichloroacetyl chloride still further.

EXAMPLE 6

Ketene prepared from acetone by means of a ketene lamp was utilized as the source of ketene in this example. The ketene supplied at about 0.6 to 0.7 mole/hour was reacted with chlorine supplied at 0.6 mole/hour in 500 ml. of sulfur dioxide at a temperature of −13 to −18° C.; the reaction period was three hours. Distillation gave the following fractions:

| Fraction | B.P. (° C.) | Weight (grams) |
| --- | --- | --- |
| 1 | Up to 101 | 51 |
| 2 | 101–104 | 78.6 |
| Residue | | 73 |

Impurities in the ketene apparently catalyzed chlorination of sulfur dioxide to sulfuryl chloride. However, the chloroacetyl chloride of fraction 2 still contained very little dichloroacetyl chloride as contaminant, the amount being about 0.07% of the fraction.

The ketene lamp utilized in the above-procedure was of the type described by Williams and Hurd, J. Org. Chem., 5, 122 (1940). The ketene-containing gases generated therein were passed through two salt ice-cooled traps to remove acetone prior to introduction into the reactor.

The reaction temperatures for the chlorination of ketene to chloroacetyl chloride in the presence of sulfur dioxide can vary over a wide range, e.g., from about −50° C. in the liquid phase to about 200° C. in the vapor phase. It is preferred to conduct the chlorination in the liquid phase, which, with sulfur dioxide as the sole solvent, will ordinarily be about −10° C. or lower; temperatures of about −30 to −10° C. are very suitable. However, by use of pressures greater than atmospheric, or by mixing the sulfur dioxide with higher boiling solvents in which sulfur dioxide gas has an appreciable solubility, it is possible to conduct the liquid phase chlorination at higher temperatures, such as up to about 50° C.

The amount of sulfur dioxide to be used will depend on the results desired and to some extent upon the reaction conditions. Any substantial amounts, even trace amounts, will have some effect in directing the chlorination toward the production of chloroacetyl chloride at the expense of dichloroacetyl chloride. If, as is usually the case, it is desired to substantially eliminate the production of dichloroacetyl chloride, a sufficient amount of sulfur dioxide will be utilized to achieve this result. The amount of sulfur dioxide sufficient for such purpose will vary to some extent with the reaction temperature and with the ratio of chlorine to ketene. However, an amount of sulfur dioxide such that on a molar basis it is equal to or greater than the amount of chloroacetyl chloride present at the end of the reaction is very suitable for eliminating the production of dichloroacetyl chloride. If no chloroacetyl chloride is originally present, proper proportions can be insured by providing an amount of sulfur dioxide at least equimolar to the ketene reactant. Large excesses of sulfur dioxide, e.g., 5 to 15 moles or more for each mole of ketene, can be employed, but the employment of such large excesses is unnecessary. On the other hand, it is desirable to have at least one mole of sulfur dioxide for every three moles of ketene to have a great effect on the course of the chlorination.

The sulfur dioxide, chlorine and ketene will ordinarily be added to the reactor as such. However, it will be understood that reactions in which any or all of the above components are generated in situ are contemplated by the present invention.

The ketene and chlorine in the present process can suitably be reacted in approximately equimolar proportions, in the presence of an equimolar or greater proportion of sulfur dioxide. Excesses of either reactant can be used, e.g., a 100% or greater molar excess of either reactant; it is not necessary in the present procedure to use large excesses of ketene to obtain a pure chloroacetyl chloride, although such excesses can be used; of course, the use of excess ketene lowers the percent conversion based upon ketene, and the excess ketene also has some tendency to polymerize under the reaction conditions. The use of excess chlorine may be desirable in some cases to avoid excessive polymerization or formation of high boilers.

The procedures described herein are very suitable for conducting the chlorination reaction of the present invention. However, various other mixing apparatus and reactors and mixing procedures may be used with equal or possibly greater effectiveness. The use of various types of mixing nozzles or other mixing or agitating apparatus adaptable to continuous processes is contemplated as within the present invention. It is also contemplated that the reaction can be carried out as a one-stage or several stage batch or continuous operation; for example, it might be desirable to conduct a several-stage reaction in which separate increments of the chlorine were added at a plurality of points along the path of flow of the ketene and sulfur dioxide mixture through a reaction tube, or to add increments of chlorine to separate reaction vessels in series containing the reaction mixture. As the reaction is rapid and exothermic, no extended reaction period is required, and procedures for rapidly removing the products from the reaction zone are contemplated as part of the present invention.

A process of preparing chloroacetyl chloride in good yields and conversions has been described in which the chlorination of ketene is directed toward chloroacetyl chloride at the expense of dichloroacetyl chloride by the presence of sulfur dioxide in the reaction mixture. Conditions for using sulfur dioxide to eliminate the production of dichloroacetyl chloride in the chlorination of ketene to chloroacetyl chloride have been described.

I claim:
1. The process of preparing chloroacetyl chloride which comprises chlorinating ketene in the presence of sulfur dioxide.
2. The process of preparing chloroacetyl chloride which comprises reacting chlorine and ketene in suf- ficient sulfur dioxide to eliminate the production of any substantial amounts of dichloroacetyl chloride.

3. The method of claim 2 in which excess chlorine is used.

4. The method of claim 2 in which approximately equimolar amounts of chlorine and ketene are used.

5. The process of preparing chloroacetyl chloride which comprises contacting ketene with chlorine in liquid sulfur dioxide, the ketene and chlorine being in the proportions of 1 mole ketene to 0.5 to 2 moles chlorine.

6. The process of directing the chlorination of ketene toward the production of chloroacetyl chloride at the expense of dichloroacetyl chloride which comprises contacting ketene with chlorine in the presence of more than 1 mole of sulfur dioxide for every 3 moles of ketene.

7. The process of preparing chloroacetyl chloride free from dichloroacetyl chloride which comprises reacting approximately equimolar quantities of chlorine and ketene in sulfur dioxide at a temperature of about $-30°$ C. to $-10°$ C., the amount of sulfur dioxide being much greater than equimolar with the ketene and chlorine, and preventing the production of dichloroacetyl chloride.

No references cited.